(12) United States Patent
Combs et al.

(10) Patent No.: US 12,729,993 B2
(45) Date of Patent: Sep. 8, 2026

(54) DEVICES AND METHODS FOR COLLECTING VOLUMETRIC MEASUREMENTS OF OBJECTS WITH COMPLEX SHAPES

(71) Applicant: ARIZONA BOARD OF REGENTS ON BEHALF OF THE UNIVERSITY OF ARIZONA, Tucson, AZ (US)

(72) Inventors: Truman Combs, Tucson, AZ (US); Kamel Didan, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 310 days.

(21) Appl. No.: 18/567,709

(22) PCT Filed: Jun. 10, 2022

(86) PCT No.: PCT/US2022/033097

§ 371 (c)(1),
(2) Date: Dec. 6, 2023

(87) PCT Pub. No.: WO2022/261495

PCT Pub. Date: Dec. 15, 2022

(65) Prior Publication Data

US 2024/0263984 A1 Aug. 8, 2024

Related U.S. Application Data

(60) Provisional application No. 63/209,230, filed on Jun. 10, 2021.

(51) Int. Cl.
*G01F 17/00* (2006.01)

(52) U.S. Cl.
CPC .................................. *G01F 17/00* (2013.01)

(58) Field of Classification Search
CPC ...................................................... G01F 17/00
See application file for complete search history.

(56) References Cited

U.S. PATENT DOCUMENTS 3,129,585 A 4/1964 Hamilton
4,144,749 A 3/1979 Whitmore
(Continued)

FOREIGN PATENT DOCUMENTS

CN 101672678 A * 3/2010
CN 108007522 A * 5/2018 ............ G01F 17/00
SU 1800279 A1 3/1993

OTHER PUBLICATIONS

Combs, T.P.; Didan, K.; Dierig, D.; Jarchow, C.J.; Barreto-Muñoz, A. Estimating Productivity Measures in Guayule Using UAS Imagery and Sentinel-2 Satellite Data. Remote Sens. 2022, 14, 2867. https://doi.org/10.3390/rs14122867.

*Primary Examiner* — Thomas M Hammond, III
(74) *Attorney, Agent, or Firm* — NGUYEN TARBET IP LAW

(57) ABSTRACT

Direct measurements of plant morphological characteristics can be difficult. Allometric equations can relate traits such as canopy height (CH) and width or stem diameter at breast height (DBH) to coarse measures of biomass or volume. However, precise and accurate measurements of plants and other irregular objects are still difficult. Thus, the present invention was developed as a simple and effective solution for quickly measuring the volume of plants. The devices and methods described herein allow for the precise and accurate measurement of plants as well as other irregularly shaped objects.

20 Claims, 4 Drawing Sheets

(56) References Cited

U.S. PATENT DOCUMENTS

Figure 1:
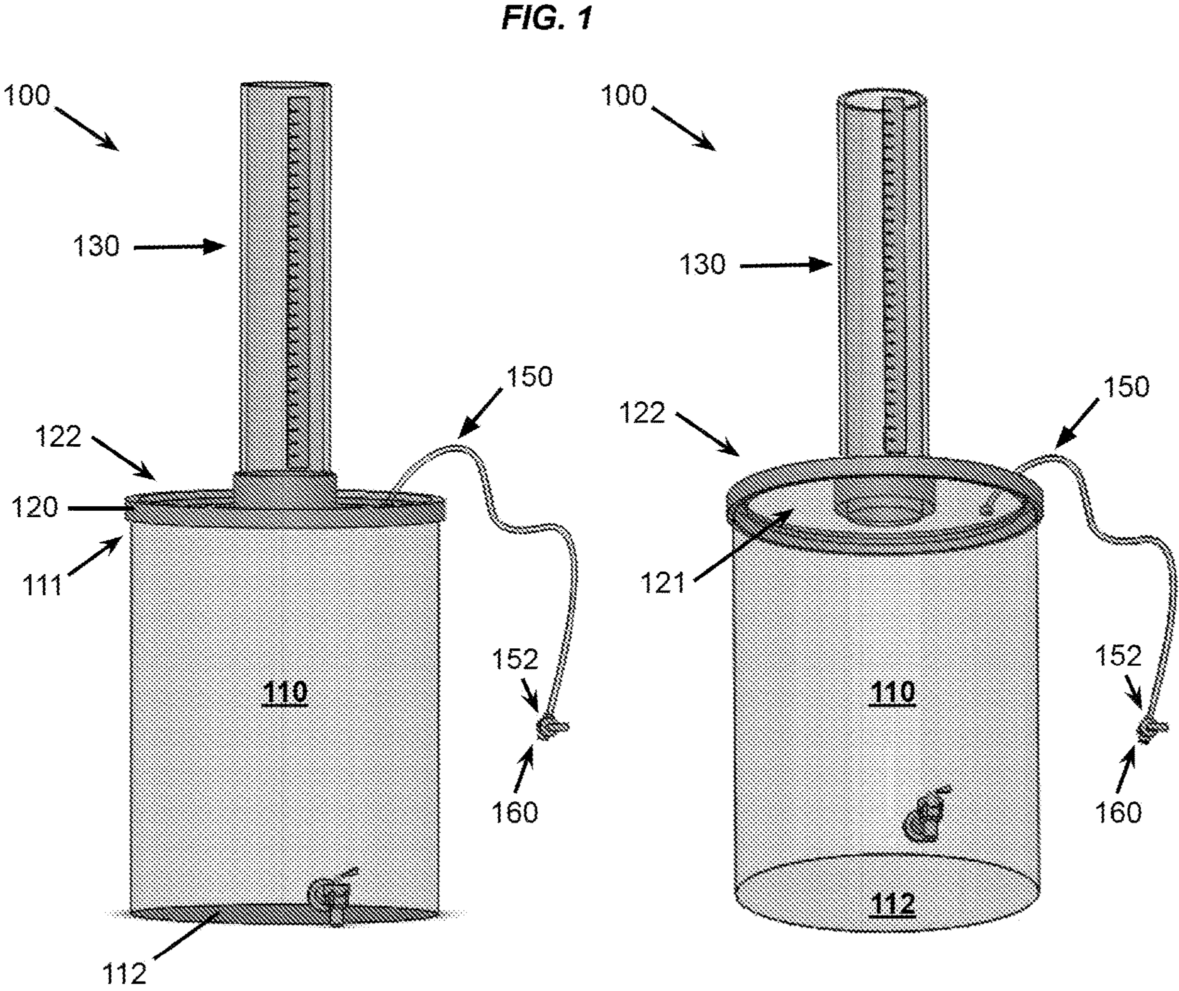

| | | | | |
|---|---|---|---|---|
| 4,196,618 | A * | 4/1980 | Patterson | G01F 17/00 73/437 |
| 2007/0167878 | A1* | 7/2007 | Turner | A61B 5/4393 600/587 |
| 2017/0038200 | A1 | 2/2017 | Stemkens et al. | |
| 2017/0199068 | A1* | 7/2017 | Abate | G01F 17/00 |
| 2022/0011272 | A1* | 1/2022 | Sydoruk | G01F 17/00 |

* cited by examiner

DEVICES AND METHODS FOR COLLECTING VOLUMETRIC MEASUREMENTS OF OBJECTS WITH COMPLEX SHAPES

CROSS-REFERENCES TO RELATED APPLICATIONS

This application claims benefit of U.S. Provisional Application No. 63/209,230 filed Jun. 10, 2021, the specification of which is incorporated herein in its entirety by reference.

FIELD OF THE INVENTION

The present invention features devices and methods for volumetric measurement of objects with complex shapes.

BACKGROUND OF THE INVENTION

Real-world biological objects often take the form of irregular shapes with cavities and do not allow for straightforward volumetric measurement. Plants and other objects with irregular or convoluted shapes require unique approaches to estimating volume. Most approaches either use 3D scanning or allometric relationships to arrive at a coarse estimate of the volume. These methods remain mostly "ad hoc" and fail to meet the demand for highly accurate and precise field or lab-based measures of volume.

Described herein the present invention features devices and methods capable of accurately and precisely measuring the volume of any object, regardless of shape or the presence of open cavities.

BRIEF SUMMARY OF THE INVENTION

It is an objective of the present invention to provide devices and methods that allow for measuring volumes of any complex shape (e.g., small to large plants, solid complex objects, mechanical parts, etc.) provided any cavities in the object are exposed to the open air (i.e., not sealed), as specified in the independent claims. Embodiments of the invention are given in the dependent claims. Embodiments of the present invention can be freely combined with each other if they are not mutually exclusive.

The present invention features a low-cost and customizable (i.e., capable of scaling to accommodate objects with different sizes or shapes) device that can provide a simple and direct means of quickly measuring the volume (as well as the derived material density) of any object. In the fields of biological and agricultural system management, researchers are often interested in collecting key phenotypic information, which traditionally was restricted to height or post-harvest weight measures for the sake of simplicity.

The devices described herein can serve a multitude of markets and industrial uses which would benefit from high-precision and high-accuracy measures of volume for objects with complex shapes.

The present invention features a device for collecting volumetric measurements. In some embodiments, the device comprises a chamber enclosing a space and configured to contain a liquid. The chamber may comprise a first end and a second end. In some embodiments, the device comprises a chamber lid disposed on the first end of the chamber. In some embodiments, the device comprises a vertical reducer fluidically coupled to the chamber lid. The vertical reducer may comprise a scale for measuring liquid. In some embodiments, the device comprises a spigot disposed adjacent to the second end of the chamber. In some embodiments, the device comprises a tube comprising a first end and a second end. In some embodiments, the tube is disposed through the chamber lid such that the second end of the tube is disposed outside the chamber lid and the first end of the tube is disposed inside the chamber lid. In some embodiments, the device comprises a valve disposed at the second end of the tube. In some embodiments, to measure a volume of an object, the chamber is filled with a liquid and the object is placed inside the chamber, and the linear displacement of the liquid measured by the vertical reducer (130) is correlated with the volume of the object.

The present invention may also feature methods for collecting volumetric measurements of an object with a complex shape. In some embodiments, the method comprises filling a device as described herein with a liquid. In some embodiments, the method comprises taking an initial measurement of the liquid using the vertical reducer. In some embodiments, the method comprises draining some of the liquid from the chamber using the spigot to accommodate the volume of an object being measured. In some embodiments, the method comprises saving the drained water in a separate container. In some embodiments, the method comprises adding an object to the chamber of the device and adding the saved water back to the chamber of the device through the vertical reducer. In some embodiments, the method comprises agitating the chamber and evacuating the air from the chamber. In some embodiments, the method comprises taking a second measurement of the water using the vertical reducer. In some embodiments, the difference between the initial and second measurements represents the volume of the object.

One of the unique and inventive technical features of the present invention is the vertical reducer component of the device. Without wishing to limit the invention to any theory or mechanism, it is believed that the technical feature of the present invention advantageously provides for high-resolution volume measurements. An additional unique and inventive technical feature of the present invention is the air valve components of the device. Without wishing to limit the invention to any theory or mechanism, it is believed that the technical feature of the present invention advantageously allows for the evacuation of air from the system which results in a more accurate and precise volumetric measurement of any object, regardless of shape or the presence of open cavities. None of the presently known prior references or work has the unique inventive technical feature of the present invention.

Furthermore, the prior references teach away from the present invention. For example, most current methods follow three ways to estimate volume: 1) Geometric decomposition of the object into simpler and more standard units of shape that are added to derive the total volume, 2) Volume displacement, which is more of the theoretical technique and there are no elaborate devices that will do this besides for example the standard graduated tubes or beakers that could be used to immerse then calculate the volume of the usually small objects, or 3) Modern 3D optical or physical scanning techniques. These methods mostly present techniques that exploit principles rather than complete operational devices that could be used with real-world complex objects and certainly not large objects.

Therefore, the devices and method described herein allow for the direct measurement of the volume of small, medium, and/or large complex/irregular objects (e.g., plants).

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which:

FIG. 1 shows a non-limiting example of a device described herein for collecting volumetric measurements of objects with complex shapes.

Figure 2:
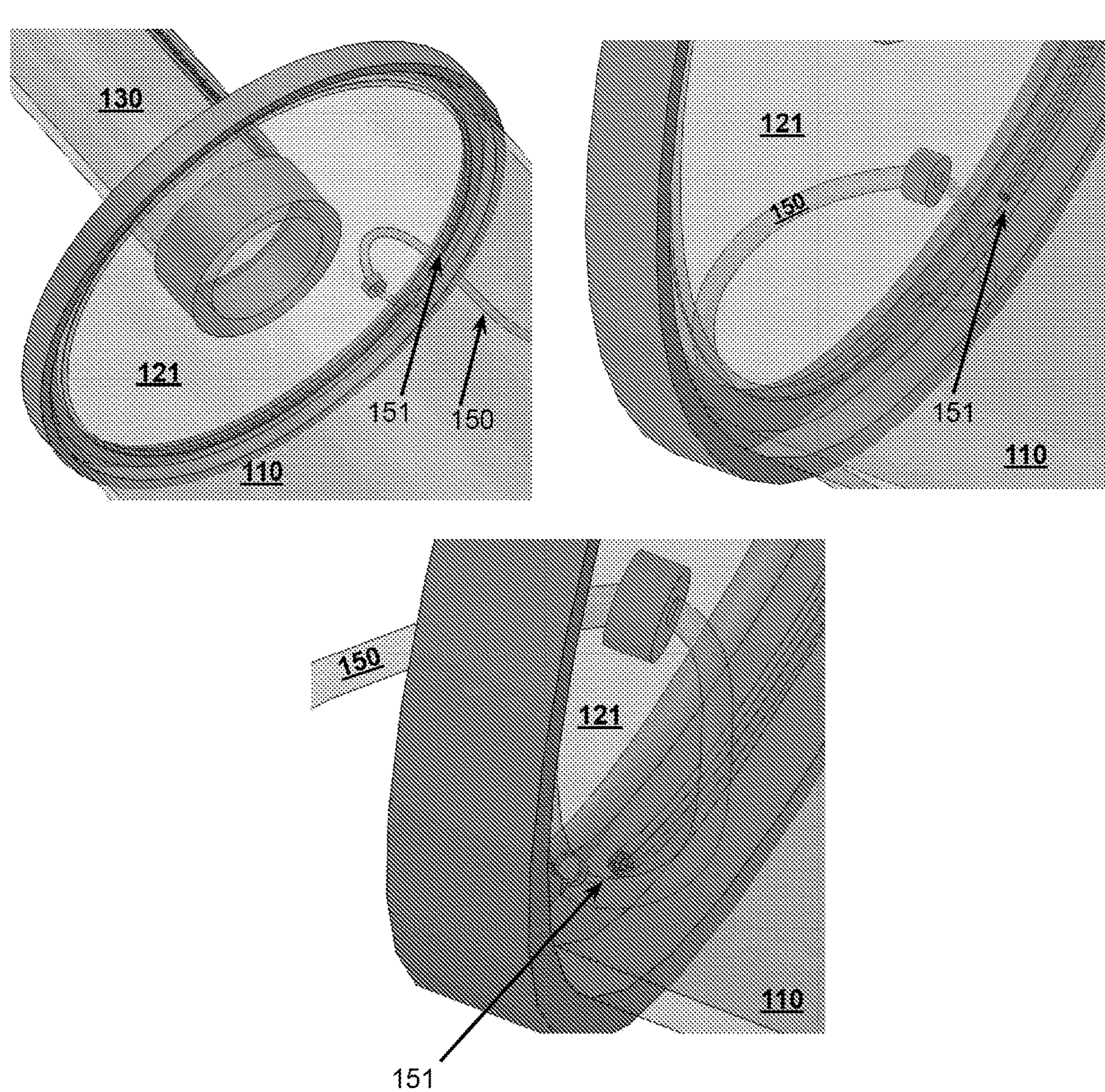

FIG. 2 shows a non-limiting close-up view on the inner surface of the chamber lid. Specifically, FIG. 2 shows how an interior portion of the tube may wrap circumferentially around the inner surface of the chamber lid, but the first end of the tube is not overlapped by the tubing itself. In some embodiments, the interior portion of the tube is not wrapped circumferentially around the inner surface of the chamber lid. In some embodiments, the device comprises no interior portion of the tube and only comprises an exterior portion of the tube disposed on the outer surface of the chamber lid.

Figure 3A:
Figure 3B:
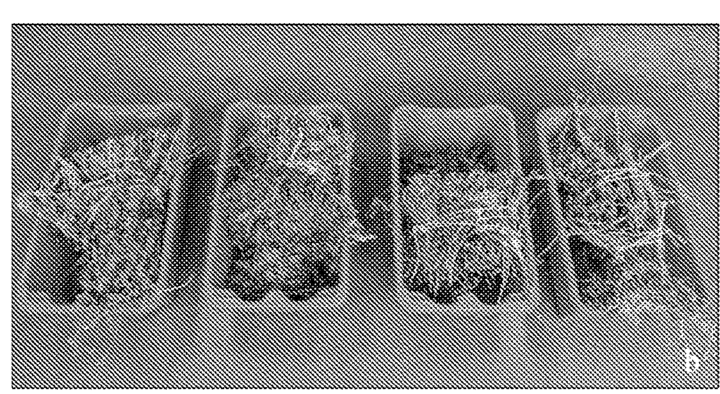
Figure 3C:
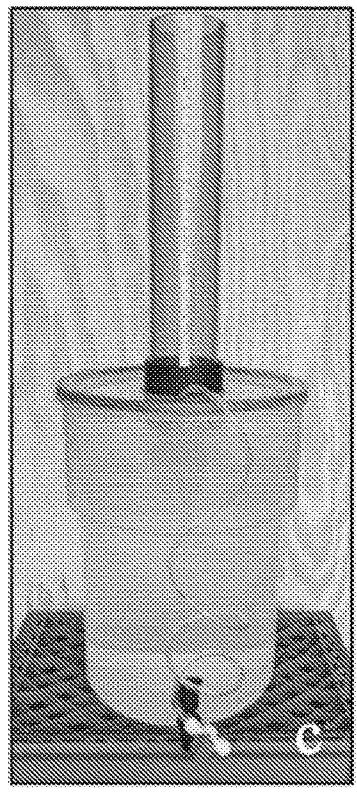
Figure 3D:
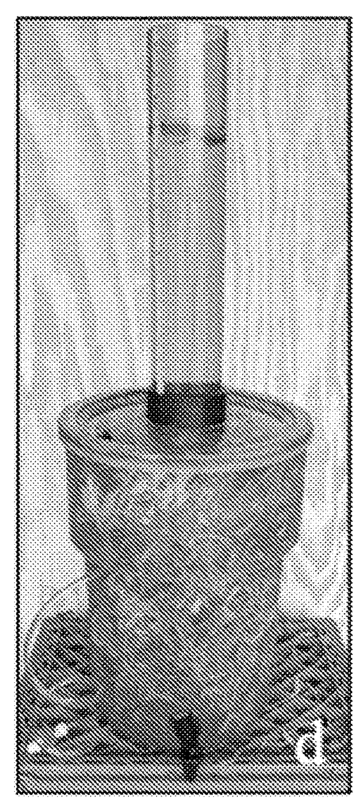

FIGS. 3A, 3B, 3C, and 3D shows a non-limiting example of several steps for the methods described herein. FIG. 3A shows an example of a one-square-meter of guayule after harvesting. FIG. 3B shows an example of how the sample of guayule was quartered along the vertical axis to create four subsamples. FIG. 3C shows the device after the water has been strategically removed through the lower spigot and set aside to allow for the addition of a subsample of plant material from FIG. 3B. FIG. 3D shows the device after a subsample from FIG. 3B has been added to the device and the removed water has been replaced so that the displacement (i.e., a second measurement) can be recorded.

Figure 4:
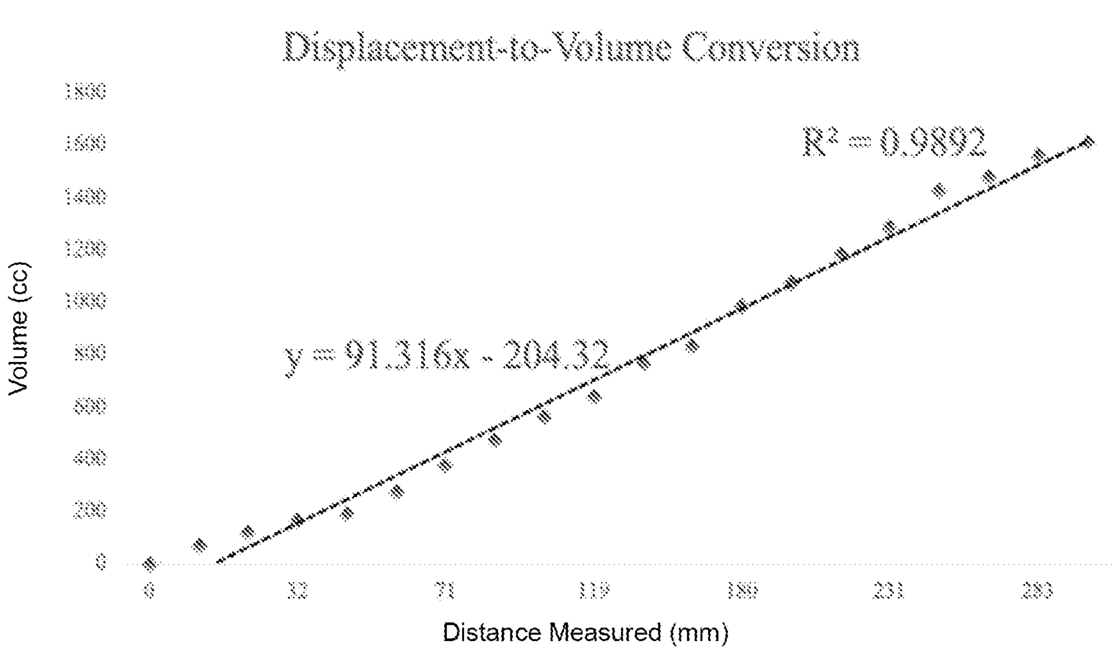

FIG. 4 shows the equation used to convert the linear displacement to volumetric units.

DETAILED DESCRIPTION OF THE INVENTION

Following is a list of elements corresponding to a particular element referred to herein:

100 Device
110 Chamber
111 First End
112 Second End
120 Chamber Lid
121 Inner surface
122 Outer Surface
130 Vertical Reducer
140 Spigot
150 Tube
151 First End
152 Second End
160 Valve Referring now to FIGS. 1-4, the present invention features devices and methods for volumetric measurement of objects, more particularly objects with complex shapes. As used herein, a "complex shape" may refer to any irregular shape for which common geometric formulas for calculating volume do not exist.

The present invention features a device (100) for collecting volumetric measurements. In some embodiments, the device (100) comprises a chamber (110) enclosing a space and configured to contain a liquid. The chamber (110) may comprise a first end (111) and a second end (112). In some embodiments, the device (100) comprises a chamber lid (120) disposed on the first end (111) of the chamber (110). In some embodiments, the device (100) comprises a vertical reducer (130) fluidically coupled to the chamber lid (120). The vertical reducer (130) may comprise a scale for measuring liquid. In some embodiments, the device (100) comprises a spigot (140) disposed adjacent to the second end (112) of the chamber (110). In some embodiments, the device (100) comprises a tube (150) comprising a first end (151) and a second end (152). In some embodiments, the tube (150) disposed through the chamber lid (120) such that the second end (152) of the tube (150) is disposed outside of the chamber lid (120) and the first end (151) of the tube (150) is disposed inside of the chamber lid (120). In some embodiments, the device (100) comprises a valve (160) disposed at the second end (152) of the tube (150). In some embodiments, to measure a volume of an object, the chamber is filled with a liquid and the object is placed inside the chamber, and the linear displacement of the liquid measured by the vertical reducer (130) is correlated with the volume of the object.

In some embodiments, the tube (150) comprises an interior portion and an exterior portion. In some embodiments, the exterior portion of the tube (150) is disposed on the outside of the chamber lid (120) such that the second end (152) of the tube (150) is disposed outside of the chamber lid (120). In some embodiments, the interior portion of the tube (150) is disposed on the inside of the chamber lid (120) such that the first end (151) of the tube (150) is disposed on the inside of the chamber lid (120). In some embodiments, the interior portion on the tube (150) is disposed on the inner surface (121) of the chamber lid (120). In some embodiments, the interior portion of the tube (150) is circumferentially disposed around the inner surface (121) of the chamber lid (120). In some embodiments, the first end (151) of the tube (150) is disposed on the inner surface (121) of the chamber lid (120). In other embodiments, the first end (151) of the tube (150) is disposed within the chamber (110) of the device (100). In some embodiments, the first end (151) of the tube (150) is covered with mesh.

In other embodiments, the devices (100) described herein do not comprise an interior portion of the tube (150) and only comprise an exterior portion of the tube (150). In some embodiments, the exterior portion of the tube (150) is disposed through the chamber lid (120) such that the first end (151) of the tube (150) is flush with the inner surface (121) of the chamber lid (120). In some embodiments, the exterior portion of the tube (150) is disposed outside of the chamber lid (110).

The tube (150) comprising a first end (151) and a second end (152) described herein is configured to remove (i.e., evacuate) air from inside the chamber (110).

In some embodiments, the chamber (110) is cylindrical. In other embodiments, the chamber (110) is cube shaped and/or square shaped. In further embodiments, the chamber (110) is cone shaped. In some embodiments, the chamber (110) is a cuboid.

In some embodiments, the chamber (110) can accommodate about 0.5 gallons to 10 gallons of liquid, or about 0.5 gallons to 9 gallons of liquid, or about 0.5 gallons to 8 gallons of liquid, or about 0.5 gallons to 7 gallons of liquid, or about 0.5 gallons to 6 gallons of liquid, or about 0.5 gallons to 5 gallons or liquid, or about 0.5 gallons to 4 gallons of liquid, or about 0.5 gallons to 3 gallons of liquid or about 0.5 gallons to 2 gallons of liquid, or about 0.5 to 1 gallon of liquid, or about 1 gallons to 10 gallons of liquid, or about 1 gallons to 9 gallons of liquid, or about 1 gallons to 8 gallons of liquid, or about 1 gallons to 7 gallons of liquid, or about 1 gallons to 6 gallons of liquid, or about 1 gallons to 5 gallons or liquid, or about 1 gallons to 4 gallons of liquid, or about 1 gallons to 3 gallons of liquid or about 1 gallons to 2 gallons of liquid, or about 2 gallons to 10 gallons of liquid, or about 2 gallons to 9 gallons of liquid, or about 2 gallons to 8 gallons of liquid, or about 2 gallons to 7 gallons of liquid, or about 2 gallons to 6 gallons of liquid, or about 2 gallons to 5 gallons or liquid, or about 2 gallons to 4 gallons of liquid, or about 2 gallons to 3 gallons of liquid or about 3 gallons to 10 gallons of liquid, or about 3 gallons to 9 gallons of liquid, or about 3 gallons to 8 gallons of liquid, or about 3 gallons to 7 gallons of liquid, or about 3 gallons to 6 gallons of liquid, or about 3 gallons to 5 gallons or liquid, or about 3 gallons to 4 gallons of liquid, or about 4 gallons to 10 gallons of liquid, or about 4 gallons to 9 gallons of liquid, or about 4 gallons to 8 gallons of liquid, or about 4 gallons to 7 gallons of liquid, or about 4 gallons to 6 gallons of liquid, or about 4 gallons to 5 gallons or liquid, or about 5 gallons to 10 gallons of liquid, or about 5 gallons to 9 gallons of liquid, or about 5 gallons to 8 gallons of liquid, or about 5 gallons to 7 gallons of liquid, or about 5 gallons to 6 gallons of liquid, or about 6 gallons to 10 gallons of liquid, or about 6 gallons to 9 gallons of liquid, or about 6 gallons to 8 gallons of liquid, or about 6 gallons to 7 gallons of liquid, or about 7 gallons to 10 gallons of liquid, or about 7 gallons to 9 gallons of liquid, or about 7 gallons to 8 gallons of liquid, or about 8 gallons to 10 gallons of liquid, or about 8 gallons to 9 gallons of liquid, or about 9 gallons to 10 gallons of liquid. In some embodiments, the chamber (110) can accommodate about 0.5 gallon of liquid, or about 1 gallon of liquid, or about 2 gallons of liquid, or about 3 gallons of liquid, or about 4 gallons of liquid, or about 5 gallons of liquid, or about 6 gallons of liquid, or about 7 gallons of liquid, or about 8 gallons of liquid, or about 9 gallons of liquid, or about 10 gallons of liquid. In some embodiments, the chamber (110) can accommodate less than 0.5 gallons of liquid. In some embodiments, the chamber (110) can accommodate more than 10 gallons of liquid. The devices described herein are scalable and therefore the amount of liquid the chamber (110) can accommodate may vary depending on the object being measured, e.g., the chamber may be able to accommodate 25 gallons or 50 gallons of liquid.

In some embodiments, the chamber (110) has a diameter of about 0.5 ft to 10 ft, or about 0.5 ft to 9 ft, or about 0.5 ft to 8 ft, or about 0.5 ft to 7 ft, or about 0.5 ft to 6 ft, or about 0.5 ft to 5 ft, or about 0.5 ft to 4 ft, or about 0.5 ft to 3 ft, or about 0.5 ft to 2 ft, or about 0.5 ft to 1 ft, or about 1 ft to 10 ft, or about 1 ft to 9 ft, or about 1 ft to 8 ft, or about 1 ft to 7 ft, or about 1 ft to 6 ft, or about 1 ft to 5 ft, or about 1 ft to 4 ft, or about 1 ft to 3 ft, or about 1 ft to 2 ft, or about 2 ft to 10 ft, or about 2 ft to 9 ft, or about 2 ft to 8 ft, or about 2 ft to 7 ft, or about 2 ft to 6 ft, or about 2 ft to 5 ft, or about 2 ft to 4 ft, or about 2 ft to 3 ft, or about 3 ft to 10 ft, or about 3 ft to 9 ft, or about 3 ft to 8 ft, or about 3 ft to 7 ft, or about 3 ft to 6 ft, or about 3 ft to 5 ft, or about 3 ft to 4 ft, or about 4 ft to 10 ft, or about 4 ft to 9 ft, or about 4 ft to 8 ft, or about 4 ft to 7 ft, or about 4 ft to 6 ft, or about 4 ft to 5 ft, or about 5 ft to 10 ft, or about 5 ft to 9 ft, or about 5 ft to 8 ft, or about 5 ft to 7 ft, or about 5 ft to 6 ft, or about 6 ft to 10 ft, or about 6 ft to 9 ft, or about 6 ft to 8 ft, or about 6 ft to 7 ft, or about 7 ft to 10 ft, or about 7 ft to 9 ft, or about 7 ft to 8 ft, or about 8 ft to 10 ft, or about 8 ft to 9 ft, or about 9 ft to 10 ft. In some embodiments, the chamber (110) has a diameter of about 1 foot, or about 2 ft, or about 3 ft, or about 4 ft, or about 5 ft, or about 6 ft, or about 7 ft, or about 8 ft, or about 9 ft, or about 10 feet. In some embodiments, the chamber (110) has a diameter less than 0.5 feet. In some embodiments, the chamber (110) has a diameter greater than 10 feet. The devices described herein are scalable and therefore the diameter of the chamber (110) may vary depending on the object being measured, e.g., the chamber (110) may have a diameter of 25 or 50 feet or the chamber (110) may have a diameter of 0.25 or 0.1 feet.

In some embodiments, the chamber (110) has a diagonal length of 0.5 ft to 10 ft, or about 0.5 ft to 9 ft, or about 0.5 ft to 8 ft, or about 0.5 ft to 7 ft, or about 0.5 ft to 6 ft, or about 0.5 ft to 5 ft, or about 0.5 ft to 4 ft, or about 0.5 ft to 3 ft, or about 0.5 ft to 2 ft, or about 0.5 ft to 1 ft, or about 1 ft to 10 ft, or about 1 ft to 9 ft, or about 1 ft to 8 ft, or about 1 ft to 7 ft, or about 1 ft to 6 ft, or about 1 ft to 5 ft, or about 1 ft to 4 ft, or about 1 ft to 3 ft, or about 1 ft to 2 ft, or about 2 ft to 10 ft, or about 2 ft to 9 ft, or about 2 ft to 8 ft, or about 2 ft to 7 ft, or about 2 ft to 6 ft, or about 2 ft to 5 ft, or about 2 ft to 4 ft, or about 2 ft to 3 ft, or about 3 ft to 10 ft, or about 3 ft to 9 ft, or about 3 ft to 8 ft, or about 3 ft to 7 ft, or about 3 ft to 6 ft, or about 3 ft to 5 ft, or about 3 ft to 4 ft, or about 4 ft to 10 ft, or about 4 ft to 9 ft, or about 4 ft to 8 ft, or about 4 ft to 7 ft, or about 4 ft to 6 ft, or about 4 ft to 5 ft, or about 5 ft to 10 ft, or about 5 ft to 9 ft, or about 5 ft to 8 ft, or about 5 ft to 7 ft, or about 5 ft to 6 ft, or about 6 ft to 10 ft, or about 6 ft to 9 ft, or about 6 ft to 8 ft, or about 6 ft to 7 ft, or about 7 ft to 10 ft, or about 7 ft to 9 ft, or about 7 ft to 8 ft, or about 8 ft to 10 ft, or about 8 ft to 9 ft, or about 9 ft to 10 ft. In some embodiments, the chamber (110) has a diagonal length of about 1 foot, or about 2 ft, or about 3 ft, or about 4 ft, or about 5 ft, or about 6 ft, or about 7 ft, or about 8 ft, or about 9 ft, or about 10 feet. In some embodiments, the chamber (110) has a diagonal length less than 0.5 feet. In some embodiments, the chamber (110) has a diagonal length greater than 10 feet. The devices described herein are scalable and therefore the diagonal length of the chamber (110) may vary depending on the object being measured, e.g., the chamber (110) may have a diameter of 25 or 50 feet or the chamber (110) may have a diameter of 0.25 or 0.1 feet.

In some embodiments, the chamber (110) has a height of about 0.25 ft to 10 ft, or about 0.25 ft to 9 ft, or about 0.25 ft to 8 ft, or about 0.25 ft to 7 ft, or about 0.25 ft to 6 ft, or about 0.25 ft to 5 ft, or about 0.25 ft to 4 ft, or about 0.25 ft to 3 ft, or about 0.25 ft to 2 ft, or about 0.25 ft to 1 ft, or about 0.25 ft to 0.5 ft, or about 0.5 ft to 10 ft, or about 0.5 ft to 9 ft, or about 0.5 ft to 8 ft, or about 0.5 ft to 7 ft, or about 0.5 ft to 6 ft, or about 0.5 ft to 5 ft, or about 0.5 ft to 4 ft, or about 0.5 ft to 3 ft, or about 0.5 ft to 2 ft, or about 0.5 ft to 1 ft, or about 1 ft to 10 ft, or about 1 ft to 9 ft, or about 1 ft to 8 ft, or about 1 ft to 7 ft, or about 1 ft to 6 ft, or about 1 ft to 5 ft, or about 1 ft to 4 ft, or about 1 ft to 3 ft, or about 1 ft to 2 ft, or about 2 ft to 10 ft, or about 2 ft to 9 ft, or about 2 ft to 8 ft, or about 2 ft to 7 ft, or about 2 ft to 6 ft, or about 2 ft to 5 ft, or about 2 ft to 4 ft, or about 2 ft to 3 ft, or about 3 ft to 10 ft, or about 3 ft to 9 ft, or about 3 ft to 8 ft, or about 3 ft to 7 ft, or about 3 ft to 6 ft, or about 3 ft to 5 ft, or about 3 ft to 4 ft, or about 4 ft to 10 ft, or about 4 ft to 9 ft, or about 4 ft to 8 ft, or about 4 ft to 7 ft, or about 4 ft to 6 ft, or about 4 ft to 5 ft, or about 5 ft to 10 ft, or about 5 ft to 9 ft, or about 5 ft to 8 ft, or about 5 ft to 7 ft, or about 5 ft to 6 ft, or about 6 ft to 10 ft, or about 6 ft to 9 ft, or about 6 ft to 8 ft, or about 6 ft to 7 ft, or about 7 ft to 10 ft, or about 7 ft to 9 ft, or about 7 ft to 8 ft, or about 8 ft to 10 ft, or about 8 ft to 9 ft, or about 9 ft to 10 ft. In some embodiments, the chamber (110) has a height of about 0.25 ft, or about 0.5 ft, or about 1 ft, or about 2 ft, or about 3 ft, or about 4 ft, or about 5 ft, or about 6 ft, or about 7 ft, or about 8 ft, or about 9 ft, or about 10 feet. In some embodiments, the chamber (110) has a height of less than 0.25 ft. In some embodiments, the chamber (110) has a height of greater than 10 feet. The devices described herein are scalable and therefore the height of the chamber (110) may vary depending on the object being measured, e.g., the chamber (110) may have a height of 25 or 50 feet or the chamber (110) may have a height of 0.25 or 0.1 feet.

In some embodiments, the chamber (110) is made from a rigid material, such that the material does not expand under the pressure of the water. Non-limiting examples of materials that may be used to construct the chamber (110) include but are not limited to polyvinyl chloride (PVC), polypropylene, thick plexiglass, glass, metal, reinforced plexiglass, plexiglass derivatives, or plastic. In some embodiments, the chamber (110) is made from transparent material. In some embodiments, the material may comprise a level of transparency sufficient for detecting the presence/absence of air accumulation in the chamber (110).

In some embodiments, the chamber lid (120) is constructed from the same material as the chamber (110). In other embodiments, the chamber lid (120) is constructed from a different material than the chamber (110). Non-limiting examples of materials that may be used to construct the chamber lid (120) include but are not limited to polyvinyl chloride (PVC), polypropylene, thick plexiglass, glass, metal, reinforced plexiglass, plexiglass derivatives or plastic.

In some embodiments, the chamber lid (120) is circular. In other embodiments, the chamber lid (120) is square shaped. In further embodiments, the chamber lid (120) is rectangular in shape. In some embodiments, the chamber lid (120) is removable. In some embodiments, the chamber lid (120) is designed to fit tightly over the chamber (110) such that no liquid is lost between the chamber lid (120) and the chamber (110). In some embodiments, the chamber lid (110) may comprise a seal (e.g., an o-ring) to ensure a tight seal between the chamber lid (120) and the chamber (110).

In some embodiments, the chamber lid (120) is flat. In other embodiments, the chamber lid (120) is domed. Without wishing to limit the present invention to any theory or mechanism it is believed that using a domed chamber lid (120) will help and guide any trapped air toward the top where it can be evacuated.

In some embodiments, the vertical reducer (130) is cylindrical. In other embodiments, the vertical reducer (130) is cube shaped. In further embodiments, the vertical reducer (130) is a cuboid. In other embodiments, the vertical reducer (130) is rectangular.

In some embodiments, the vertical reducer (130) is centrally disposed on the chamber lid (120). In other embodiments, the vertical reducer (130) is not centrally disposed on the chamber lid (120) and is off-center on the chamber lid (120). In some embodiments, the vertical reducer (130) is attached to the chamber lid (120). In other embodiments, the vertical reducer (130) is detachable from the chamber lid (120). In such embodiments, i.e., wherein the vertical reducer (130) is detachable from the chamber lid (120) one vertical reduce (130) may be substituted (i.e., replaced) with another vertical reducer (130) with different specifications (e.g., different height or diameter) and may permit measurements with a different degree of measurement resolution and/or granularity.

In some embodiments, the device (100) comprises one vertical reducer (130). In other embodiments, the device (100) comprises two vertical reducers (130). In some embodiments, the device (100) comprises three vertical reducers (130). In some embodiments, the device (100) comprises four vertical reducers (130). In other embodiments, the device (100) comprises five vertical reducers (130). The devices described herein are customizable and therefore, the number of vertical reducers (130) may vary depending on the object being measured.

Without wishing to limit the present invention to any theories or mechanisms it is believed that devices (100) comprising more than one vertical reduces (130) of identical or varying specifications (e.g., diameter or height), a user can meet the particular needs of a project which might necessitate the measurement of larger/smaller objects, or have a particular level of measurement resolution. In some embodiments, the obtain the volume of an object being measured with a device (110) comprising a plurality of vertical reducers (130) the sum of the linear displacements of the liquid measured by the vertical reducers (130) is calculated and is correlated to the volume of the object.

In some embodiments, the vertical reducer (130) has a diameter of about 0.5 inches to 5.0 in, or about 0.5 in to 4.5 in, or about 0.5 in to 4.0 in, or about 0.5 in to 3.5 in, or about 0.5 in to 3.0 in, or about 0.5 in to 2.5 in, or about 0.5 in to 2.0 in, or about 0.5 in to 1.5 in, or about 0.5 in to 1.0 in, or about 1.0 in to 5.0 in, or about 1.0 in to 4.5 in, or about 1.0 in to 4.0 in, or about 1.0 in to 3.5 in, or about 1.0 in to 3.0 in, or about 1.0 in to 2.5 in, or about 1.0 in to 2.0 in, or about 1.0 in to 1.5 in, or about 1.5 in to 5.0 in, or about 1.5 in to 4.5 in, or about 1.5 in to 4.0 in, or about 1.5 in to 3.5 in, or about 1.5 in to 3.0 in, or about 1.5 in to 2.5 in, or about 1.5 in to 2.0 in, or about 2.0 in to 5.0 in, or about 2.0 in to 4.5 in, or about 2.0 in to 4.0 in, or about 2.0 in to 3.5 in, or about 2.0 in to 3.0 in, or about 2.0 in to 2.5 in, or about 2.5 in to 5.0 in, or about 2.5 in to 4.5 in, or about 2.5 in to 4.0 in, or about 2.5 in to 3.5 in, or about 2.5 in to 3.0 in, or about 3.0 in to 5.0 in, or about 3.0 in to 4.5 in, or about 3.0 in to 4.0 in, or about 3.0 in to 3.5 in, or about 3.5 in to 5.0 in, or about 3.5 in to 4.5 in, or about 3.5 in to 4.0 in, or about 4.0 in to 5.0 in, or about 4.0 in to 4.5 in, or about 4.5 in to 5.0 in. In some embodiments, the vertical reducer has a diameter of about 0.5 inches, or about 1.0 in, or about 1.5 in, or about 2.0 in, or about 2.5 in, or about 3.0 in, or about 3.5 in, or about 4.0 in, or about 4.5 in, or about 5.0 in. In some embodiments, the vertical reducer (130) has a diameter less than 0.50 inches. In some embodiments, the vertical reducer (130) has a diameter greater than 5.0 inches. The devices described herein are scalable and therefore the diameter of the vertical reducer (130) may vary depending on the object being measured, e.g., the vertical reducer (130) may have a diameter of 10 or 15 inches or the vertical reducer (130) may have a diameter of 0.25 or 0.1 inches.

In some embodiments, the vertical reducer (130) has a diagonal length of 0.5 inches to 5.0 in, or about 0.5 in to 4.5 in, or about 0.5 in to 4.0 in, or about 0.5 in to 3.5 in, or about 0.5 in to 3.0 in, or about 0.5 in to 2.5 in, or about 0.5 in to 2.0 in, or about 0.5 in to 1.5 in, or about 0.5 in to 1.0 in, or about 1.0 in to 5.0 in, or about 1.0 in to 4.5 in, or about 1.0 in to 4.0 in, or about 1.0 in to 3.5 in, or about 1.0 in to 3.0 in, or about 1.0 in to 2.5 in, or about 1.0 in to 2.0 in, or about 1.0 in to 1.5 in, or about 1.5 in to 5.0 in, or about 1.5 in to 4.5 in, or about 1.5 in to 4.0 in, or about 1.5 in to 3.5 in, or about 1.5 in to 3.0 in, or about 1.5 in to 2.5 in, or about 1.5 in to 2.0 in, or about 2.0 in to 5.0 in, or about 2.0 in to 4.5 in, or about 2.0 in to 4.0 in, or about 2.0 in to 3.5 in, or about 2.0 in to 3.0 in, or about 2.0 in to 2.5 in, or about 2.5 in to 5.0 in, or about 2.5 in to 4.5 in, or about 2.5 in to 4.0 in, or about 2.5 in to 3.5 in, or about 2.5 in to 3.0 in, or about 3.0 in to 5.0 in, or about 3.0 in to 4.5 in, or about 3.0 in to 4.0 in, or about 3.0 in to 3.5 in, or about 3.5 in to 5.0 in, or about 3.5 in to 4.5 in, or about 3.5 in to 4.0 in, or about 4.0 in to 5.0 in, or about 4.0 in to 4.5 in, or about 4.5 in to 5.0 in. In some embodiments, the vertical reducer has a diagonal length of about 0.5 inches, or about 1.0 in, or about 1.5 in, or about 2.0 in, or about 2.5 in, or about 3.0 in, or about 3.5 in, or about 4.0 in, or about 4.5 in, or about 5.0 in. In some embodiments, the vertical reducer (130) has a diagonal length less than 0.50 inches. In some embodiments, the vertical reducer (130) has a diagonal length greater than 5.0 inches. The devices described herein are scalable and therefore the diagonal length of the vertical reducer (130) may vary depending on the object being measured, e.g., the vertical reducer (130) may have a diagonal length of 10 or 15 inches or the vertical reducer (130) may have a diagonal length of 0.25 or 0.1 inches.

In some embodiments, the vertical reducer (130) has a height of about 0.25 ft to 2 ft, or about 0.25 ft to 1.5 ft, or about 0.25 ft to 1.0 ft, or about 0.25 ft to 0.5 ft, or about 0.5 ft to 2 ft, or about 0.5 ft to 1.5 ft, or about 0.5 ft to 1.0 ft, or about 1.0 ft to 2 ft, or about 1.0 ft to 1.5 ft, or about 1.5 ft to 2 ft. In some embodiments, the vertical reducer (130) has a height of about 0.25 ft, or about 0.5 ft, or about 1.0 ft, or about 1.5 ft, or about 2.0 ft. In some embodiments, the vertical reducer (130) has a height of less than 0.25 ft. In some embodiments, the vertical reducer (130) has a height of greater than 2 feet. The devices described herein are scalable and therefore the height of the vertical reducer (130) may vary depending on the object being measured, e.g., the vertical reducer (130) may have a height of 3 or 4 feet or the vertical reducer (130) may have a height of 0.1 or 0.01 feet.

In some embodiments, the device (100) may comprise a plurality of vertical reducers (130) with the same shape (i.e., cylindrical or rectangular). In other embodiments, the device (100) may comprise a plurality of vertical reducers (130) with different shapes (i.e., cylinder and rectangular). In some embodiments, the device (100) may comprise a plurality of vertical reducers (130) with the same diameter. In other embodiments, the device (100) may comprise a plurality of vertical reducers (130) with different diameters. In some embodiments, the device (100) may comprise a plurality of vertical reducers (130) with the same diagonal length. In other embodiments, the device (100) may comprise a plurality of vertical reducers (130) with different diagonal lengths. In some embodiments, all of the plurality of vertical reducers (130) comprises a scale for measuring liquid. In other embodiments, some of the plurality of vertical reducers (130) comprise a scale for measuring liquid. In some embodiments, at least one of the plurality of vertical reducers (130) comprises a scale for measuring liquid.

Without wishing to limit the present invention to any theories or mechanisms it is believed that devices (100) described herein with a plurality of vertical reducers (130) of different sizes and/or shapes requires all of the plurality of vertical reducers (130) to comprise a scale for measuring liquid. In some embodiments, devices (100) described herein with a plurality of vertical reducers (130) of the same size and shape need at least one vertical reducer (130) of the plurality of vertical reducers (130) to comprise a scale from measure liquid. Without wishing to limit the present invention to any theories or mechanisms it is believed that the volume of an object could be calibrated with at least one vertical reducer (130) of the plurality of vertical reducers (130) (when the plurality of vertical reducers (130) are the same shape and size) and then scaled by the number of vertical reducers (130) on the device.

In some embodiments, the vertical reducer (130) can be scaled diametrically or in quantity (i.e., to include multiple reducers) to achieve acceptable, experiment-specific levels of error. Without wishing to limit the present invention to any theory or mechanisms it is believed that a vertical reducer (130) with a smaller diameter is more accurate and allows for a less error and a higher resolution.

In some embodiments, the vertical reducer (130) further comprises a scale for measuring liquid. In other embodiments, the vertical reducer (130) further comprises a scale for measuring the height of liquid in the device. In some embodiments, the scale is in millimeters or sub-millimeters.

In some embodiments, the vertical reducer (130) is made from a rigid material, such that the material does not expand under the pressure of the water. Non-limiting examples of materials that may be used to construct the vertical reducer (130) include but are not limited to polyvinyl chloride (PVC), transparent PVC, plexiglass, reinforced plexiglass, glass, reinforced plastic, or metal. In some embodiments, the material used to construct the vertical reducer (130) is transparent.

In some embodiments, the linear displacement of an object may be measured within the vertical reducer using an automated rangefinder approach, thus eliminating the need for transparent materials. Therefore, in some embodiments, the material used to construct the vertical reducer may be opaque.

In some embodiments, the devices described herein comprise an air evacuation system. In some embodiments, the air evacuation system allows for the removal of air trapped within the closed chamber (110) (i.e., the chamber (110) when the chamber lid (120) is attached and water is re-added to the chamber (110)). In some embodiments, the air evacuation system is automatic and is able to efficiently and automatically evacuate accumulated air without manual user inspection.

In some embodiments, the air evacuation system comprises a tube (150) comprising a first end (151) and a second end (152). In some embodiments, the tube (150) comprises an interior portion and an exterior portion. In some embodiments, the exterior portion of the tube (150) is disposed on the outer surface (122) of the chamber lid (120) (i.e. outside of the chamber lid). In some embodiments, the interior portion of the tube (150) is disposed on the inner surface (121) of the chamber lid (120) (i.e. inside of the chamber lid and/or inside the chamber). In some embodiments, the interior portion of the tube (150) is circumferentially disposed around the inner surface (121) of the chamber lid (120). In some embodiments, the first end (151) of the tube is disposed on the outer periphery of the inner surface (121) of the chamber lid (120). In some embodiments, the tube (150) intersects the chamber lid (120) such that the second end (152) of the tube (150) is disposed outside of the chamber lid (120). In some embodiments the air evacuation system comprises a valve (160) disposed at the second end (152) of the tube (150). In some embodiments, when the valve (160) is opened, air from inside of the chamber (110) may be released.

In some embodiments, the valve (160) is a ball valve. Any type of valve system with the ability to initiate evacuation and termination of the flow of fluids (e.g., air) may be used in accordance with the devices (100) described herein.

In some embodiments, the device comprises a spigot (140). In some embodiments, the spigot (140) is adjacently disposed at the second end (112) of the chamber (110). Without wishing to limit the invention to any theory or mechanism, it is believed that the spigot (140) of a device as described herein advantageously provides for a way for efficiently removing liquid from the device for future use. In some embodiments, the spigot (140) allows for the removal of liquid (e.g., water) from the device (100). In some embodiments, the liquid (e.g., water) removed from the device (100) via the spigot (140) is collected and set aside for later use.

The device uses the principle of relating linear displacement to volumetric content. By immersing the object in a chamber sized to meet the needs of the user and filled with water, any linear displacement (of water level) can be measured within a vertical reducer mounted to the top of the chamber. An initial measurement of the water level within the reducer is recorded. Enough water to accommodate the full volume of the object is then drained away but retained for later use. The object is immersed in the chamber which is then resealed. The water that was drained away and set aside is reintroduced to the system through the vertical reducer. The chamber is agitated to dislodge any air that may be trapped within the larger chamber or within the object cavities. Any remaining air that fails to be removed by this agitation step through the vertical reducer is cleared via a flexible, perforated tube encircling the inside perimeter of the chamber lid. The tubing is routed through the lid (and appropriately sealed) and ends in a ball valve. The valve is opened to release any remaining air. A minimal amount of water may escape during this process, but it is collected and added back to the vertical reducer. Once all air is released and water restored to the reducer, a second measurement of the new water level is recorded. The difference between the initial and second measurements represents the linear displacement, which is adjusted by the inner diameter of the vertical reducer to calculate the total volume contributed by the object. This device can measure the volume of any complex shape (e.g., small to large plants, solid complex objects, mechanical parts, etc.) provided any cavities in the object are exposed to the open air (i.e., not sealed).

The present invention may also feature methods for collecting volumetric measurements of an object with a complex shape. In some embodiments, the method comprises filling the device (100) described herein with a liquid. In some embodiments, the method comprises taking an initial measurement of the liquid using the vertical reducer (130). In some embodiments, the method comprises draining some of the liquid from the chamber (110) using the spigot (140) to accommodate the volume of an object being measured. In some embodiments, the method comprises saving the drained water in a separate container. In some embodiments, the method comprises adding the object to the chamber (110) of the device (100) and adding the saved water back to the chamber (110) of the device (100) through the vertical reducer (130). In some embodiments, the method comprises agitating the chamber and evacuating the air from the chamber (110). In some embodiments, the method comprises taking a second measurement of the water using the vertical reducer (130). In some embodiments, the difference between the initial and second measurements represents the volume of the object.

In preferred embodiments, the liquid is water. Without wishing to limit the present invention to any theories or mechanisms it is believed that the use of water in the devices described herein is advantageous because water is very accessible, inexpensive, and cost-effective to filter if needed. In some embodiments, the liquid (i.e., water) may be filtered to allow for subsequent use of the liquid in the methods and devices described herein. In other embodiments, the liquid is a non-volatile liquid.

In some embodiments, the device (100) (e.g., the chamber (110)) is agitated. In some embodiments, the chamber (110) is agitated in a controlled manner. Without wishing to limit the present invention to any theories or mechanisms it is believed that agitation of the chamber (110) liberates any air trapped in areas of the object or lower regions of the chamber (110) that otherwise would not be evacuated in the absence of the agitation step. As used herein, "agitation" refers to any amount of movement of the chamber (110) which effectively liberates air pockets.

In some embodiments, the chamber (110) is agitated for about 1 minute. In some embodiments, the chamber (110) is agitated for about 2 minutes. In some embodiments, the chamber (110) is agitated for about 3 minutes. In some embodiments, the chamber (110) is agitated for about 4 minutes. In some embodiments, the chamber (110) is agitated for about 5 minutes. In some embodiments, the chamber (110) is agitated for about 6 minutes. In some embodiments, the chamber (110) is agitated for about 7 minutes. In some embodiments, the chamber (110) is agitated for about 8 minutes. In some embodiments, the chamber (110) is agitated for about 9 minutes. In some embodiments, the chamber (110) is agitated for about 10 minutes. In some embodiments, the chamber (110) is agitated for more than 10 minutes. The object of agitating the chamber (110) is to allow all the air still present in the chamber (110) to migrate to the top of the chamber (110; i.e., the first end (111) of the chamber (110)).

In some embodiments, evacuating the air from the chamber (110) comprises tilting the chamber (110) such that any remaining air within the chamber (110) migrates towards the highest point on the device (100). In some embodiments, evacuating the air from the chamber (110) comprises tilting the chamber (110) such that the first end (151) of the tube (150) is the highest point of the chamber (110). In some embodiments, the remaining air within the chamber (110) is evacuated through the tube (150) by opening the valve (160). In some embodiments, devices (100) described herein comprising a domed chamber lid (120) may not require the chamber (110) to be tilted to allow for the evacuation of air from inside the chamber (110).

EXAMPLE

The following is a non-limiting example of the present invention. It is to be understood that said example is not intended to limit the present invention in any way. Equivalents or substitutes are within the scope of the present invention.

Plants were harvested at the soil level and promptly bound to preserve the relative height of each plant within the sample according to the alignment of the cuts (FIG. 3A). Each bound sample was quartered vertically along the main stem based on the arithmetic average of the five canopy height (CH) measurements specific to each sample (FIG. 3B), and fresh weights were recorded for each subsample (n=36) in grams. To prevent water loss and its effect on fresh volume, each subsample was sealed in an airtight plastic bag and stored in a humidity-controlled refrigeration unit until volumetric processing was performed.

Subsamples were individually immersed in a water displacement measurement chamber designed to estimate the volumetric contribution of all fresh plant material. Following immersion, the device was sealed and agitated for approximately two minutes to eliminate any air pockets that would otherwise falsely contribute to the volumetric measurements. Volume was recorded as the displacement of water in mm within a vertically-oriented, transparent PVC reducer following the addition of plant material (FIGS. 3C and 3D). Displacement was converted to volumetric terms using a simple calibration equation determined empirically and based on chamber design specifications (FIG. 4).

To estimate volumetric measurement chamber precision, an independent sample was collected from treatment A-50 for evaluation. The sample was segmented according to the process described above. The top section (i.e., Tier 1) was immersed in the chamber and its volume recorded. Without removing the subsample but instead removing and preserving the original volume of water used to measure displacement, the process was repeated eight times to determine if air pockets or water losses greatly affected measurement variability. The test was repeated for the bottom section (Tier 4). These subsamples reflect the extremes of resource allocation wherein most flexible stems and green leaf material occur in Tier 1 while thick, woody stem material predominates Tier 4. Tiers 2 and 3 share the qualities of both regions. We assumed issues with measurement precision (e.g., water losses or air pockets resulting in volume underestimation or overestimation, respectively) would most likely present at the extremes of resource allocation (i.e., Tier 1 or Tier 4). Each iterative measurement was compared against the arithmetic mean of all nine measurements to compute the root mean square error (RMSE) for both tiers, separately. Evaluation of the volumetric measurement chamber's precision reported low variation between repeated measurements of the same subsample. Tier 1 reported an RMSE of 2243.853 cm3 (7.44% of the average measurement for Tier 1) and Tier 4 reported an RMSE of 309.751 cm3 (2.43% of the average measurement for Tier 4). FIG. 11 depicts these error terms graphically. These findings support the use of the volumetric measurement chamber for estimating fresh plant volume.

As used herein, the term "about" refers to plus or minus 10% of the referenced number.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A device (100) for collecting volumetric measurements, the device (100) comprising a. a chamber (110) enclosing a space and configured to contain a liquid, the chamber (110) having a first end (111) and a second end (112);

b. a chamber lid (120) disposed on the first end (111) of the chamber (110);

c. a vertical reducer (130) fluidically coupled to the chamber lid (120), wherein the vertical reducer (130) comprises a scale for measuring liquid;

d. a spigot (140) disposed directly on the chamber (110), fluidically connected thereto, adjacent to the second end (112) of the chamber (110);

e. a tube (150) comprising a first end (151) and a second end (152);

wherein the spigot (140) is configured to evacuate at least a portion of the liquid from the chamber (110);

wherein the tube (150) disposed through the chamber lid (120) such that the second end (152) of the tube (150) is disposed outside of the chamber lid (120) and the first end (151) of the tube (150) is disposed inside of the chamber lid (120), wherein the tube (150) is configured to evacuate air from the chamber (110);

f. a valve (160) disposed at the second end (152) of the tube (150);

wherein to measure a volume of an object, the chamber is filled with a liquid and the object is placed inside the chamber, and the linear displacement of the liquid measured by the vertical reducer (130) is correlated with the volume of the object.

2. The device (100) of claim 1, wherein the tube (150) comprises an interior portion.

3. The device (100) of claim 2, wherein the interior portion of the tube (150) is circumferentially disposed around an inner surface (121) of the chamber lid (120).

4. The device (100) of claim 3, wherein the first end (151) of the tube (150) is disposed on the inner surface (121) of the chamber lid (120).

5. The device (100) of claim 1, wherein the first end (151) of the tube (150) is covered with mesh.

6. The device (100) of claim 1, wherein the tube (150) is configured to remove air from inside the chamber (110).

7. The device (100) of claim 1, wherein the chamber (110) is cylindrical.

8. The device (100) of claim 1, wherein the chamber (110) is square shaped.

9. The device (100) of claim 1, wherein the chamber (110) can accommodate about 1-5 gallons of liquid.

10. The device (100) of claim 1, wherein the vertical reducer (130) is a cylindrical tube.

11. The device (100) of claim 1, wherein the vertical reducer (130) is a rectangular tube.

12. The device (100) of claim 1, wherein the vertical reducer (130) is centrally disposed on the chamber lid (120).

13. The device (100) of claim 1, wherein the vertical reducer (130) has a diameter of 2.5 inches.

14. The device (100) of claim 1, wherein the valve (160) is a ball valve.

15. A method for collecting volumetric measurements of an object with a complex shape, the method comprises:

a. filling the device (100) according to claim 1 with a liquid;

b. taking an initial measurement of the liquid using the vertical reducer (130);

c. draining some of the liquid from the chamber (110) using the spigot (140) to accommodate the volume of an object being measured;

d. saving the liquid drained from (c);

e. adding the object to the chamber (110) of the device (100);

f. adding the saved liquid from (d) back to the chamber (110) of the device (100) through the vertical reducer (130);

g. agitating the chamber;

h. evacuating the air from the chamber (110); and i. taking a second measurement of the liquid using the vertical reducer (130);

wherein the difference between the initial and second measurements represents the volume of the object.

16. The method of claim 15, wherein the liquid is water.

17. The method of claim 15, wherein evacuating the air from the chamber (110) comprises tilting the chamber (110) such that any remaining air within the chamber (110) migrates towards the highest point on the device (100).

18. The method of claim 17, wherein the remaining air within the chamber (110) is evacuated through the tube (150) by opening the valve (160).

19. The method of claim 15, wherein the chamber (110) is agitated for two minutes.

20. The method of claim 15, wherein the chamber (110) is agitated for five minutes.

* * * * *